Aug. 16, 1949.  P. W. GARBO  2,478,912
FLUIDIZING PROCESS FOR ZINC RECOVERY
Filed March 13, 1947

INVENTOR.
PAUL W. GARBO.
BY
ATTORNEYS.

Patented Aug. 16, 1949

2,478,912

UNITED STATES PATENT OFFICE 2,478,912

FLUIDIZING PROCESS FOR ZINC RECOVERY

Paul W. Garbo, Freeport, N. Y., assignor to The American Metal Company, Limited, New York, N. Y., a corporation of New York Application March 13, 1947, Serial No. 734,511

7 Claims. (Cl. 75—26)

This invention relates to a process for zinc recovery and, more particularly, to a fluidizing process including the reduction of impure zinc compounds with volatilization and condensation of the zinc.

Zinc ores are found in nature mixed with other minerals of metallic or earthy nature. Many prevalent minerals found with zinc ores contain iron. It is substantially impossible to separate such minerals completely by ore-dressing and, consequently, they undergo at least in part the same treatment in smelting as the zinc mineral. In addition, there is a zinc mineral known as "marmatite," a double sulfide of zinc and iron, in which the iron cannot be separated by any of the known ore-dressing processes. Accordingly all of the iron of such mineral must pass through the usual smelting process with the zinc. If the zinc compound employed for the recovery of zinc is a sulfide, it is necessary first to roast the sulfide to produce zinc oxide. If the zinc compound employed is a carbonate, it must be calcined to drive off the carbonic acid gas.

Most zinc ores, marmatite being a common example, contain impurities of which iron is probably the most prevalent. When the zinc compound in the ore has been converted to the oxide, the impurities are generally also changed to the oxide form. Upon subsequent treatment to reduce the zinc oxide, the other oxides present, e. g., iron oxide, are also reduced at least in part. The reduction of these impurities is extremely troublesome because some of the reduced or partially reduced metal impurities like iron impurities are not volatile at the conditions under which zinc is both reduced and volatilized. Consequently, these reduced or partially reduced metal impurities are left in the gangue and under the prevailing conditions are soft and sticky promoting agglomeration of gangue particles into large clusters.

Because of this general tendency or behavior of zinc ores, attempts to apply the well-known fluidization technique to the reduction of impure zinc oxide have met with failure. As known to those skilled in the art, agglomeration is a phenomenon which opposes and destroys the phenomenon of fluidization.

An important object of this invention is to provide a simple process whereby impure zinc oxide may be reduced to zinc by the fluidization technique in spite of the presence of impurities which have a propensity for agglomeration.

Other objects will be apparent from the description of the invention, which follows:

I have found in accordance with my invention that comminuted reducible zinc compounds containing impurities which cause agglomeration may be reduced by a solid and/or gaseous reducing agent such as solid carbon (coke or the like) and gaseous carbon monoxide, methane or the like under fluidizing conditions by introducing the comminuted reducible zinc compound into a reducing zone containing a fluidized bed consisting predominantly of particles of a solid diluent. The zinc compound particles on entering the reducing zone are quickly dispersed in the mass of fluidized diluent particles because of the characteristic random motion of fluidized particles. It is obvious that the fluidized mass in the reducing zone is maintained as a bed of substantially uniform composition throughout. By maintaining suitable reaction conditions, the particles of zinc compound are reduced and zinc vapor emerges from the fluidized bed along with other gaseous components which may be passed through the fluidized bed or be generated therefrom. The residue particles resulting from the reduction of the impure zinc compound exert their usual tendency to agglomerate because of the presence of reduced or partially reduced iron and like impurities but since these particles are surrounded principally by particles of solid diluent, agglomeration is not as pronounced and, in any case, the agglomerates in the reducing zone at any given instant are present in limited proportions because, as already stated, the reducing zone contains a fluidized bed which is composed predominantly of diluent particles. Under these circumstances, fluidization within the reducing zone is not destroyed or even substantially impaired, and the process may be operated continuously for indefinite periods. The agglomerates which do form in the course of operation naturally have a larger settling rate than that of the fluidized particles; consequently the agglomerates tend to move downward through the fluidized bed and finally settle out becoming separated from the fluidized particles at the bottom of the reducing zone. The separated agglomerates are periodically or continuously withdrawn from the bottom of the reducing zone to prevent the building-up of such a mass or quantity of these agglomerates as would interfere with fluidization in the reducing zone. The agglomerating impurities will generally carry down in their clusters occlusions of diluent particles. Accordingly, there is a gradual disappearance of diluent particles in the reducing zone and for continued operation it becomes necessary periodically or continuously to make up this loss of diluent particles by adding more diluent particles to the mass in the reducing zone.

Frequently, not all of the residue of the reduction of the impure zinc compound is of the agglomerating type. In such case, the nonagglomerating residue particles may be retained in the fluidized bed within the reducing zone to replenish at least in part the particles of solid diluent loss by occlusion in the residue agglomerates, by entrainment in the gaseous effluent from the reducer or by other means. Where such nonagglomerating residue particles are not desired or are desired in limited proportion in the fluidized mass of the reducing zone these particles can be removed by entrainment in the gaseous effluent or by withdrawing a stream of the fluidized mixture. To effect removal by entrainment, the impure zinc compound fed to the reducer should preferably be in a state of subdivision such that upon reduction and at the gas velocity prevailing in the reducer the nonagglomerating residue particles will be carried out of the fluidized mass. When a stream of the fluidized solids is drawn off to remove nonagglomerating residue particles from the reducing zone, the desirable diluent particles inevitably removed with this stream should either be replaced in the reducer by a fresh supply of the desirable particles or the desirable particles should be recovered from the withdrawn stream of mixed particles by magnetic, electrostatic or like separating means and returned to the reducer. The controlled removal of non-agglomerating residue particles is advantageous in the maintenance of a predetermined proportion of solid reducing agent, e. g., coke, to fresh zinc compound in the fluidized bed of the reducer. When the fluidized mass is circulated between the reducer and a heater wherein direct firing is used to provide heat for the reducer, it may be advisable to limit the proportion of nonagglomerating residue particles in the circulating mass because such residue particles may exhibit a tendency to become oxidized in the heater and to become reduced in the reducer with consequent waste of valuable reducing gas.

The latter inefficiency in the utilization of a reducing gas may also arise where over an extended period of operation, certain impurities impregnate, saturate or otherwise build up on the powdered solid diluent used to provide the fluidized bed in the reducing zone; when the solid diluent containing such impurities circulates between the reducer and a direct-combustion heater, the impurities may be oxidized and on returning to the reducer may be again reduced with wasteful consumption of the reducing gas. Thus it will be seen that the periodic or continuous removal of contaminated particles and replenishment of fresh particles of solid diluent are often advisable in the interest of operating with a high utilization efficiency for the reducing gas.

Unlike prior processes, it is unnecesary to suddenly chill the zinc vapor produced in accordance with my invention since I have found it possible to remove the zinc vapor from the reducing zone with such a small amount of carbon dioxide that there is little or no tendency to produce blue powder and I am able to condense the zinc in liquid form substantially free from such blue powder. For this purpose, it is important to have sufficient carbon in the reducer so that the following reactions occur, for instance, when carbon monoxide is the reducing gas:

$$ZnO + CO = Zn + CO_2$$
$$CO_2 + C = 2CO$$

As a matter of fact, the solid diluent used to form the fluidized bed into which the reducible zinc compound is introduced may be finely divided carbon. Broadly speaking, carbon is not a mere diluent in the reducing zone as shown by the last equation above, but the term solid diluent broadly refers to a material used in accordance with this invention to maintain a fluidized bed in the reducing zone and is intended in this specification and the appended claims to mean only that the material does not react in any undesired way, and particularly does not react to form a sticky solid which promotes agglomeration in the fluidized bed. In this sense, carbon is a solid diluent; any reactivity realized in the reducing zone is highly desirable and beneficial. Where carbon is the solid diluent in the reducing zone, make-up carbon must be supplied at a rate commensurate with its disappearance because of both its reaction with carbon dioxide to form carbon monoxide and its almost inevitable occlusion in the clusters or agglomerates of reduced residue particles. In any event, as previously stated, to limit the presence of carbon dioxide in the gaseous effluent from the reducer and, in turn, to avoid substantially completely the formation of blue powder it is important to have sufficient carbon in the reducer; advantageously, the weight of the carbon present in the fluidized mass is at least equal to the combined weight of fresh zinc compound and non-agglomerated residue of reduction present in the fluidized mass and preferably is at least 10 times that weight.

The invention accordingly comprises the novel processes and steps of processes, specific embodiments of which are described hereinafter by way of example and in accordance with which I now prefer to practice the invention.

My process may be and preferably is operated continuously. In carrying out the process, I introduce an impure zinc compound, which may be, for instance, but without limitation, roasted or calcined zinc blende, into a reducing zone containing a fluidized mass consisting predominantly of a solid diluent, such as coal, coke, carborundum, alumina, silica or magnesia. I prefer to take the roasted ore, if possible, directly from the roasting process while it still retains a substantial proportion of the heat given it in roasting. This material, on entering the reducing zone, is simultaneously dispersed in the fluidized mass of solid diluent and contacted by a solid reducing agent like carbon and/or reducing gas such as carbon monoxide, hydrogen, methane or equivalent gas under reducing conditions. The mass of particles within the reducing zone is maintained in a fluidized condition by the passage therethrough of a gaseous medium, preferably a reducing gas like carbon monoxide. With the gaseous medium, some coke or like solid carbon may be introduced into the reducing chamber, if desired. The roasted ore may also be carried in suspension in the gas entering the reducing zone but advantageously is supplied to the reducing zone at a point above the inlet for the gas.

The comminuted impure zinc oxide is generally supplied to the reducing zone in the form of particles all of which pass through a 60-mesh screen and 30% to 60% of which pass through a 325-mesh screen. The solid diluent is also furnished as a powder of about 100 to 400 mesh in particle size. The gas velocity through the reducing zone will usually be in the range of about 0.5 to 3.0 feet per second, preferably about 0.8 to 1.5 feet per second. However, all of the foregoing factors may have values larger or smaller than the indicated advantageous ranges, as will be obvious to those skilled in the art. Thus, coarser particles may be used at higher gas velocities, say about 5 feet per second.

The settling rate of a powdered material will vary with the size, density and shape of the particles as well as with the density, velocity, etc., of the fluidizing gas or vapor. Generally, the impure zinc compound and the solid diluent are chosen in such form that both materials have roughly the same settling rate at the gas velocity used in the reducer. Where the reduction yields a residue not entirely of the agglomerating type and it is desired to remove at least some of this nonagglomerating residue by entrainment in the gaseous stream leaving the reducer, the impure zinc compound fed to the reducer should preferably have a smaller settling rate than that of the solid diluent in the fluidized bed. In such case, also, it is advisable to introduce the impure zinc compound into the lower portion of the reduction zone so that as the impure zinc compound is carried upward through the fluidized bed reduction takes place, the nonagglomerating residue continuing upwardly with the gaseous effluent and the agglomerating residue settling toward the opposite end of the reducer. Where the zinc compound has a greater settling rate than that of the solid diluent, it is advantageous to feed this material into the upper portion of the reducing zone; in such cases, there may be some tendency for the nonagglomerating residue of reduction to settle out with the agglomerates.

The bottom of the reducing chamber is provided with an exit opening and the fluidizing gas is admitted at a point near but above this exit opening in a manner such that there is a selective separation between agglomerated or sintered particles of impurities, which are formed during the reduction, and the fluidized mass in the chamber. The fluidized mass is heated in accordance with one embodiment of the process by fuel oil or combustible gas passing through tubes, which tubes pass through the chamber in which the reaction occurs. These tubes may be used to maintain the reduction zone at a temperature of the order of 1600° to 2300° F., preferably about 1800° to 2000° F. At such temperatures, zinc oxide may be reduced by contact with both carbon monoxide and carbon and zinc vapors passing upwardly through the fluidized mass leave the chamber accompanied by carbon monoxide and such a small proportion of carbon dioxide that substantially no blue powder is formed while condensing the zinc vapors.

The gas introduced at or near the exit of the reducing chamber produces, as stated, a classifying action on the sintered impurities usually containing a large proportion of iron together with ash from the coke or the like and these flow downwardly through the gas stream, being in agglomerated condition and pass out while the fluidized material remains in the chamber.

In accordance with another embodiment of the process, the fluidized mass is passed back and forth between two chambers, in one of which the heat is applied to the mass by direct firing of a fuel and in the other of which occurs reduction of the ore with recovery of zinc vapor and removal of the sintered or agglomerated impurities without substantial removal of the fluidized material therewith. As in the previously described embodiment, the reduction zone is maintained at a temperature of the order of 1600° to 2300° F., preferably about 1800° to 2000° F. The solid diluent flowing cyclically from the heater to the reducer and back again for the purpose of maintaining the desired reduction temperature should leave the heater at a higher temperature, say at least 150° F. higher than the reduction temperature and preferably about 400° F. higher than the reduction temperature.

In the accompanying drawings, apparatus useful for the carrying out of the process of the invention is shown, in which.

Figures 1, 2:
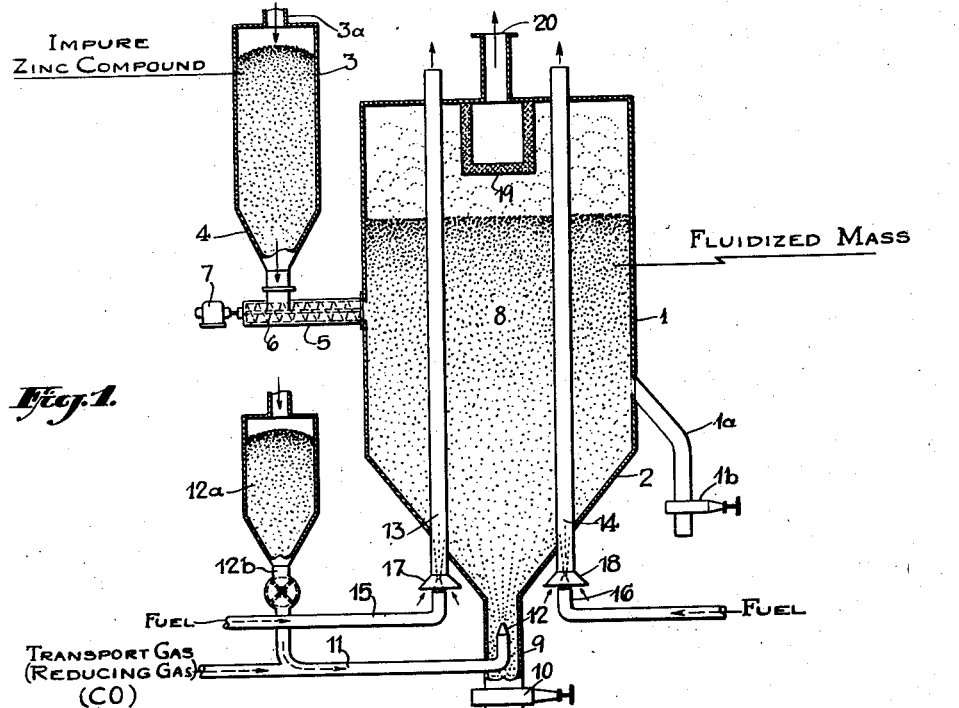
Figure 1 is a diagrammatic sectional elevation of a reduction chamber.
Figure 2 is a modified apparatus shown diagrammatically in sectional elevation, in which two chambers are employed, one of which is used for heating a fluidized mass of solid diluent and the other for reducing an impure zinc compound in a fluidized mass of the heated solid diluent.

Referring to the drawings, numeral 1 shows a preferably cylindrical chamber having a conical bottom 2, the height of the chamber from the apex of the conical bottom to the top of the chamber being two or more times the diameter of the cylinder. A smaller feed chamber 3 is located at one side of the chamber 1. It is also preferably cylindrical and provided with a conical base 4, and is connected to approximately the middle of the height of the chamber. The impure zinc compound in finely divided form is introduced into this feed chamber 3 through a pipe 3a. If desired, comminuted solid diluent may be admixed with the zinc compound to compensate for losses of solid diluent from chamber 1; such an admixture may be fed from chamber 3 to chamber 1. The zinc compound may be the roasted ore still retaining the heat from roasting. Chamber 3 discharges into a feed pipe 5 in which is a worm conveyor 6 driven by a motor 7. The dry and ground zinc compound is fed by the conveyor into chamber 1 containing a fluidized mass 8 consisting essentially of a powdered solid diluent.

The base 2 is in the form of an inverted cone truncated near its apex and its sides are attached to an exit pipe 9 provided with a slide valve 10 to permit the exit of sintered or agglomerated impurities mentioned below. A fluidizing gas, preferably a reducing gas such as carbon monoxide, is fed into the reducing chamber 1 through pipe 11. This pipe turns at right angles after entering the exit pipe 9 and has a nozzle 12 which faces upwardly and is located approximately at the apex of the truncated cone. The gas is fed in and distributed by the nozzle into the interior of the chamber 1 at a rate such that the residue particles of the zinc compound are separated from the fluidized mass. It is generally desirable to have a solid reducing agent like carbon present in the fluidized mass within the reducer. Accordingly, with the fluidizing gas, carbon such as ground coke is introduced from the hopper 12a which has a valved pipe 12b supplying, by way of pipe 11, carbon to chamber 1 where it is fluidized and consumed. Hopper 12a may also be arranged to discharge carbon directly into chamber 1 like feed chamber 3. In order to cause reduction of the zinc compound, the fluidized mass 8 is heated by means of several vertical tubes 13 and 14, in which is burned any convenient fuel, such as carbon monoxide, natural gas, oil, or the like, fed therein through pipes 15 and 16, respectively, these pipes being provided with nozzles which pass into flared openings 17 and 18 at the base of tubes 13 and 14, respectively, for admission of air for combustion.

The reduced zinc is vaporized from the fluidized mass and passes upwardly with the other effluent gases through the filter 19 and out through the exit pipe 20 to a zinc condenser (not shown).

With the reduction of the zinc compound, the size of the residue particles containing impurities like iron changes, as for instance, by agglomeration or sintering, and such sintered or agglomerated particles then pass downwardly through the chamber 1 against the turbulent passage of the reducing gas flowing upwardly in the opposite direction, and these sintered particles continuously move towards the apex of the conical base 2 and are selectively separated from the fluidized mass and pass downwardly past the nozzle 12 and finally through the valve 10 when the latter is open to discharge this residue through the lower end of the exit pipe 9. Any ash from the coke will also tend to pass out with these sintered impurities. In this manner the sintered residue from the zinc compound present at any time in the fluidized mass will be relatively small.

Chamber 1 is provided with an outlet pipe 1a controlled by slide valve 1b. Either continuously or periodically some of the fluidized mass may be drawn out of chamber 1 through this outlet. Fluidized solids would be thus withdrawn where the reduction yields some nonagglomerating residue. In such case, withdrawal is necessary else the fluidized bed will continue to rise until chamber 1 is completely filled. Instead of drawing off fluidized solids through line 1a, filter 19 may be removed and solids may be carried out of chamber 1 by entrainment in the gaseous effluent leaving by way of pipe 20. This stream may flow to a conventional cyclone, electrical precipitator or like separator wherein the solids are removed from the gases.

Referring now to Figure 2, the numeral 1 designates a chamber similar to that shown in Figure 1 provided with a conical bottom 2. It also is provided with a feed chamber 3. Chamber 3 is supplied with a comminuted mixture of impure zinc compound and carbon; make-up solid diluent to replenish any losses of the diluent from the reaction system may also be in the admixture flowing from feed chamber 3 to reducer 1. Many other methods of feeding these various powdered solids either singly or in combinations will be obvious to those skilled in the art. The bottom of this chamber, however, is connected with a feed pipe 21 provided with a slide valve 22. Into the feed pipe above the valve passes a pipe 23 for admission of nitrogen, methane or other fluidizing gas. Thus, the fluidized ground zinc compound flows through pipe 21 communicating with the chamber 1. An exit pipe 9, provided with a star valve 24, connects with the conical base 2. A pipe 11 conducts carbon monoxide or any other desired gas into the base of chamber 1. The ground zinc compound is dispersed in the fluidized mass of solid diluent as before. An exit pipe 25 leads from near the top of the fluidized bed on one side of the cylinder 1 downwardly, and connects with an air pipe 26 which passes to the base of a second chamber 27 in which the fluidized solid diluent 8a is heated. The solids are kept in a free-flowing condition in pipe 25 by carbon monoxide, hydrogen, nitrogen or other nonoxidizing gas passing through pipe 28 in order to strip residual zinc vapors from the solids. The rate of flow of solids through pipe 25 into pipe 26 is controlled by a valve 29 in pipe 25.

The heater chamber 27 is similar to the chamber 1 and is filled with fluidized material which is predominantly the solid diluent, fines or unagglomerated residue of the reduced zinc compound and unconsumed carbon from the reducer. The air conveys in suspension material passing from the chamber 1 into pipe 26. In the chamber 27, the air maintains the powdered mass in fluidized condition and supplies oxygen for combustion of the unconsumed carbon coming from the reducer. A fuel, such as fuel oil or gas, may be forced into the base of the chamber 27 through a pipe 30 to furnish additional heat in the event that the carbon flowing from the reducer to the heater is not sufficient to provide all of the heat required by the system. Near the top of this fluidized bed is an exit pipe 31 through which the material passes downwardly into reducer 1. Pipe 32 projecting into pipe 31 supplies air, steam or like gas to keep the material free-flowing so that it can pass into reducer 1. The quantity of material flowing through pipe 31 is controlled by the valve 33.

A pipe 34 leads from the top of chamber 1 to a cyclone separator 35. On reduction, zinc vapors and carbon monoxide together with a small quantity of entrained particles pass to cyclone 35. The zinc vapor and gas then pass to the condenser (not shown) while the separated particles pass downwardly through pipe 36 into the heater 27. The products of combustion from the heater 27 pass through a screen or filter 36a in the top of the heater and then out through the outlet pipe 38.

The solid diluent in fluidized condition is thus continuously heated in the heater 27 and passed from there through pipe 31 into the reducer 1 where it provides a fluidized bed wherein the zinc compound may be readily and continuously reduced by the reducing gas entering through pipe 11. Meanwhile, fresh zinc compound and carbon are continuously fed into the chamber 1 through pipe 21 and valve 22. Sintered or agglomerated impurities pass downwardly through the fluidized material in chamber 1 against the stream of carbon monoxide and pass out through star valve 24 in pipe 9. There is also a continuous flow of material from the reducer 1 through pipe 25 and thence through pipe 26 to the heater 27 for continuous reheating and recirculation back again to the reducer 1. Zinc vapors are continuously given off from the reducer 1 and are condensed and the zinc recovered.

It is well to note that if the impure zinc compound reduced in the system shown in Figure 2 is of the type yielding part nonagglomerating and part agglomerating residue provision should be made to withdraw some of the fluidized solids periodically or continuously. For such purpose, pipe 1a and valve 1b shown in Figure 1 may be similarly connected to the reducer 1 of Figure 2. Alternatively, pipe 36 may be taken out of heater 27 and made to discharge into an outside hopper for elimination of some of the powdered material. By these and equivalent means, the mass of fluidized solids in the system may be kept substantially constant.

As a specific example of the embodiment of the invention represented by Figure 1, an installation designed to deliver 2000 lbs. per hour of zinc vapor to the condensers will be considered. In this case, reducer 1 has an inside diameter of 7.2 feet and the depth of the fluidized bed 8 is about 28 feet. A temperature of 1850° F. is maintained in the fluidized mass with the aid of thirty-six fire tubes 13 and 14, each tube being 4 inches in diameter. Approximately 9100 cubic feet (standard conditions) of natural gas are burned hourly in this group of fire tubes. Reducer 1 contains a bed of fluidized coke at the start of the operation and the roasted zinc ore fed into the fluidized bed 8 has a weight analysis of ZnO 79.8%, ZnS 1.0%, $ZnSO_4$ 1.5%, $Fe_2O_3$ 11.0%, PbO 1.5%, and the remainder comprising the oxides of copper, cadmium, manganese, magnesium, calcium and silicon. The roasted ore is in the form of a powder all of which passes through a 100-mesh screen and about 45% of which is finer than 325-mesh. On reduction, this impure zinc compound yields a residue which is approximately 75% of the agglomerating type and 25% nonagglomerating. When settled operation is established the roasted zinc ore is fed at the rate of 3130 lbs. per hour and coke at the rate of 975 lbs. per hour. Carbon monoxide is supplied as the reducing gas at the hourly rate of 3590 cubic feet (standard conditions) at a gauge pressure of 4 lbs. per square inch. The gas including vaporized zinc resulting from the reduction flows up through reducer 1 at a linear velocity of about 0.8 foot per second and maintains the bed of powdered diluent in a well fluidized state. With settled operation, this bed is composed of approximately equal weights of coke and nonagglomerating residue from the reduction of the impure zinc compound. The agglomerates, predominantly coarser than 20 mesh, produced in the fluidized bed upon reduction of the impure zinc compound settle out and are withdrawn from reducer 1 by way of slide valve 10. The agglomerates discharge at an hourly rate of 725 lbs. and contain occlusions of coke amounting to nearly 50% of their weight. At the same time, to maintain the entire system in balance some of the fluidized diluent particles are withdrawn through pipe 1a controlled by valve 1b; the rate of discharge is 240 lbs. per hour. The gaseous stream leaving reducer 1 by way of pipe 20 consists essentially of zinc vapor and carbon monoxide and flows to condensers wherein the zinc is condensed and thus recovered at the rate of 2000 lbs. per hour. The residual carbon monoxide gas may be recycled to reducer 1 or may be used as fuel.

To illustrate a typical operation of the apparatus of Figure 2, the roasted zinc ore used in the preceding example will also be supplied to this system. The reduction temperature, the rates of feeding roasted ore and carbon monoxide, and the rates of withdrawal of zinc and agglomerates are maintained in this case equal to the corresponding factors in the first example. Under the selected conditions, reducer 1 has an inside diameter of 6.3 feet and heater 27 a diameter of 12.3 feet, the heights of the fluidized beds in these vessels are, respectively, 35 feet and 15 feet. The operating pressure is approximately 3 lbs. per square inch gauge. The solid diluent is chiefly a powdered magnesium oxide having a settling rate comparable to that of the roasted zinc ore. When the operation of the system reaches a steady state, vessel 3 is used to supply to reducer 1 a uniform mixture of roasted ore, coke and magnesium oxide in such proportions that the hourly charge of these materials is, respectively, 3130, 1150 and 230 lbs. The addition of magnesium oxide is to compensate for losses of this solid diluent by occlusion in the agglomerates formed by the reduction of the impure zinc compound. The gases flow up through the fluidized bed 8 with a linear velocity of about 1 foot per second, pass through pipe 34, are separated from entrained particles in cyclone 35 and flow to the condensers for the recovery of zinc. During the reduction, agglomerates are formed and settle through the fluidized mass 8, being withdrawn from the reducer by way of star valve 24. To provide the necessary heat for the reduction, the fluidized solid diluent, approximately 65% by weight of magnesium oxide, 34% of nonagglomerating residue and 1% of coke, is passed through pipes 25 and 26 into heater 27 at the rate of about 34.4 tons per hour. Air is furnished to heater 27 via pipe 26 at the hourly rate of 96,800 cubic feet (standard conditions). This air both fluidizes the solid diluent in heater 27 and provides enough oxygen to burn substantially completely all of the coke entering heater 27. By this combustion, the solid diluent attains a temperature of 2200° F. and continues its flow from heater 27 through pipe 31 into reducer 1. Thus, it will be observed that the solid diluent by its cyclic flow conveys heat from the heater 27 operating at a temperature of 2200° F. to the reducer 1 which thereby is maintained at a temperature of 1850° F. The combustion or flue gases which escape through filter 36a and pipe 38 ascend through heater 27 at a linear velocity of about 1 foot per second. It is noteworthy that in this example the fluidized mass 8 within reducer 1 contains only about 1% by weight of coke and this proportion of coke is effective in minimizing the presence of carbon dioxide in the gases leaving through pipe 34 to the point where blue powder formation is substantially prevented during the recovery of the vaporized zinc.

As brought out hereinbefore, a reducible zinc compound such as zinc oxide may be reduced to yield zinc vapor by the process of this invention when using only a solid reducing agent such as coke and a nonreducing, fluidizing gas such as nitrogen. This very surprising result may be attributable to high reactivities of zinc oxide and coke particles in a fluidized state. Also, reduction of the zinc oxide apparently is further promoted by carbon monoxide spontaneously generated within the fluidized mass.

Those skilled in the art will visualize many variations of the invention without departing from its spirit or intent. For instance, in the last example, other refractories like finely divided zircon may be used in lieu of magnesium oxide and losses of this solid diluent may be made up by adequate additions introduced by way of vessel 3 or a similar charging vessel connected to heater 27 or a hopper discharging into air pipe 26. Accordingly, the foregoing disclosure should be interpreted as being illustrative of the invention and not restrictive; only such limitations should be imposed as are indicated in the appended claims.

What I claim is:

1. A process for the reduction of a solid reducible zinc compound containing agglomerating impurities in substantial quantity, which comprises establishing a fluidized mass of a nonagglomerating solid diluent in comminuted form, introducing said zinc compound in comminuted form and a reducing agent into said fluidized mass, effecting reduction of said zinc compound in said fluidized mass at an elevated temperature which causes agglomeration while maintaining said fluidized mass with a substantially uniform composition throughout consisting principally of said solid diluent, removing from the bottom of said fluidized mass impurity agglomerates forming and settling through said fluidized mass during said reduction, and recovering zinc from the gaseous effluent from said fluidized mass.

2. The process of claim 1 wherein the non-agglomerating solid diluent in comminuted form is powdered coke.

3. A process for the reduction of finely divided impure zinc oxide containing iron oxide in a quantity exerting a substantial agglomerating propensity during reduction at a temperature in the range of 1600° to 2300° F., which comprises establishing a fluidized mass of non-agglomerating solid diluent in comminuted form, introducing said zinc oxide and a solid carbonaceous reducing agent in comminuted form into said fluidized mass, effecting reduction of said zinc oxide in said fluidized mass at a temperature in the range of 1600° to 2300° F. while maintaining said fluidized mass with a substantially uniform composition throughout consisting principally of said solid diluent, removing from the bottom of said fluidized mass iron-containing agglomerates forming and settling through said fluidized mass during said reduction, and recovering zinc from the gaseous effluent from said fluidized mass.

4. A process for the reduction of finely divided impure zinc oxide containing iron oxide in a quantity exerting a substantial agglomerating propensity during reduction at a temperature in the range of 1600° to 2300° F., which comprises fluidizing a mass of powdered coke with an upflowing stream of carbon monoxide, introducing into the thus fluidized mass said zinc oxide and additional powdered coke, effecting reduction of said zinc oxide in said fluidized mass at a temperature in the range of 1600° to 2300° F. while maintaining said fluidized mass with a substantially uniform composition throughout consisting principally of said powdered coke, removing from the bottom of said fluidized mass iron-containing agglomerates forming and settling through said fluidized mass during said reduction, and recovering zinc from the gaseous effluent from said fluidized mass.

5. A process for the reduction of a solid reducible zinc compound containing agglomerating impurities in substantial quantity, which comprises establishing a fluidized mass of a refractory non-agglomerating solid diluent in comminuted form in two interconnected zones, introducing said zinc compound in comminuted form and a reducing agent into said fluidized mass in one of said zones, effecting reduction of said zinc compound in said fluidized mass in said one zone at an elevated temperature which causes agglomeration while maintaining said fluidized mass in said one zone with a substantially uniform composition throughout consisting principally of said solid diluent, removing from the bottom of said fluidized mass in said one zone impurity agglomerates forming and settling therethrough during said reduction, recovering zinc from the gaseous effluent from said one zone, conducting combustion in direct contact with said fluidized mass in the other of said zones to heat said fluidized mass in said other zone to a temperature above said elevated temperature, and circulating said fluidized mass between said zones to maintain said elevated temperature in said one zone.

6. The process of claim 5 wherein the reducing agent is powdered coke and a part of said coke is combusted in said other zone.

7. A process for the reduction of finely divided impure zinc oxide containing iron oxide in a quantity exerting a substantial agglomerating propensity during reduction at a temperature in the range of 1600° to 2300° F., which comprises establishing a fluidized mass of a refractory non-agglomerating solid diluent in comminuted form in two interconnected zones, introducing said zinc oxide and a solid carbonaceous reducing agent in comminuted form into said fluidized mass in one of said zones, effecting reduction of said zinc oxide in said fluidized mass in said one zone at an elevated temperature in the range of 1600° to 2300° F. while maintaining said fluidized mass in said one zone with a substantially uniform composition throughout consisting principally of said solid diluent, removing from the bottom of said fluidized mass in said one zone iron-containing agglomerates forming and settling therethrough during said reduction, recovering zinc from the gaseous effluent from said one zone, conducting combustion in direct contact with said fluidized mass in the other of said zones to heat said fluidized mass in said other zone to a temperature at least 150° F. above said elevated temperature, and circulating said fluidized mass between said zones to maintain said elevated temperature in said one zone.

PAUL W. GARBO.

REFERENCES CITED

The following references are of record in the file of this patent:

UNITED STATES PATENTS

| Number | Name | Date |
|---|---|---|
| 2,316,664 | Brassert et al. | Apr. 13, 1943 |
| 2,393,704 | Ogorzaly | Jan. 29, 1946 |